May 20, 1969
B. G. MARKS
3,445,672
FLAW DETECTION AND MARKING SYSTEM
Filed Aug. 15, 1966
Sheet __1__ of 2
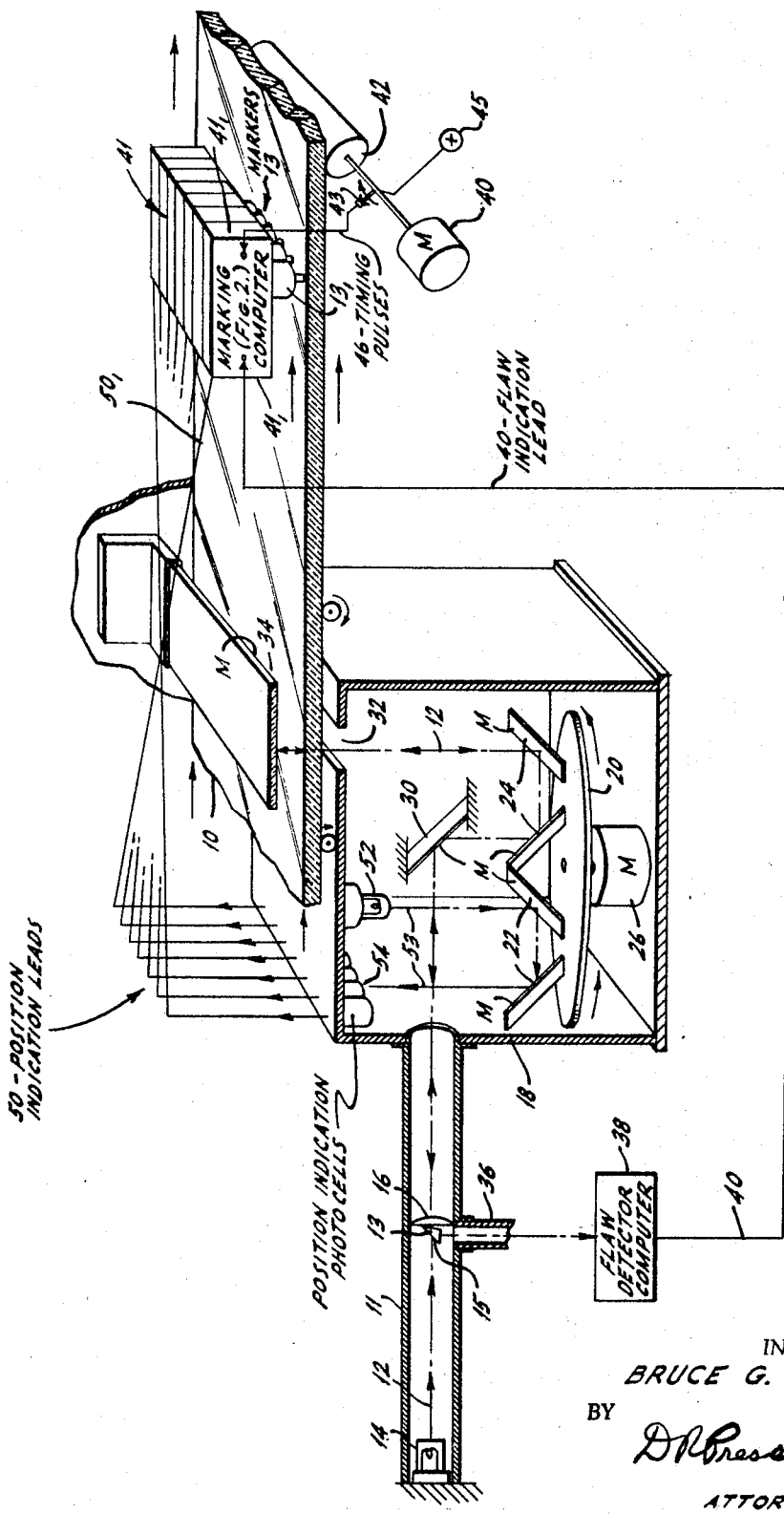
INVENTOR.
BRUCE G. MARKS
BY
D. R. Cressman
ATTORNEY

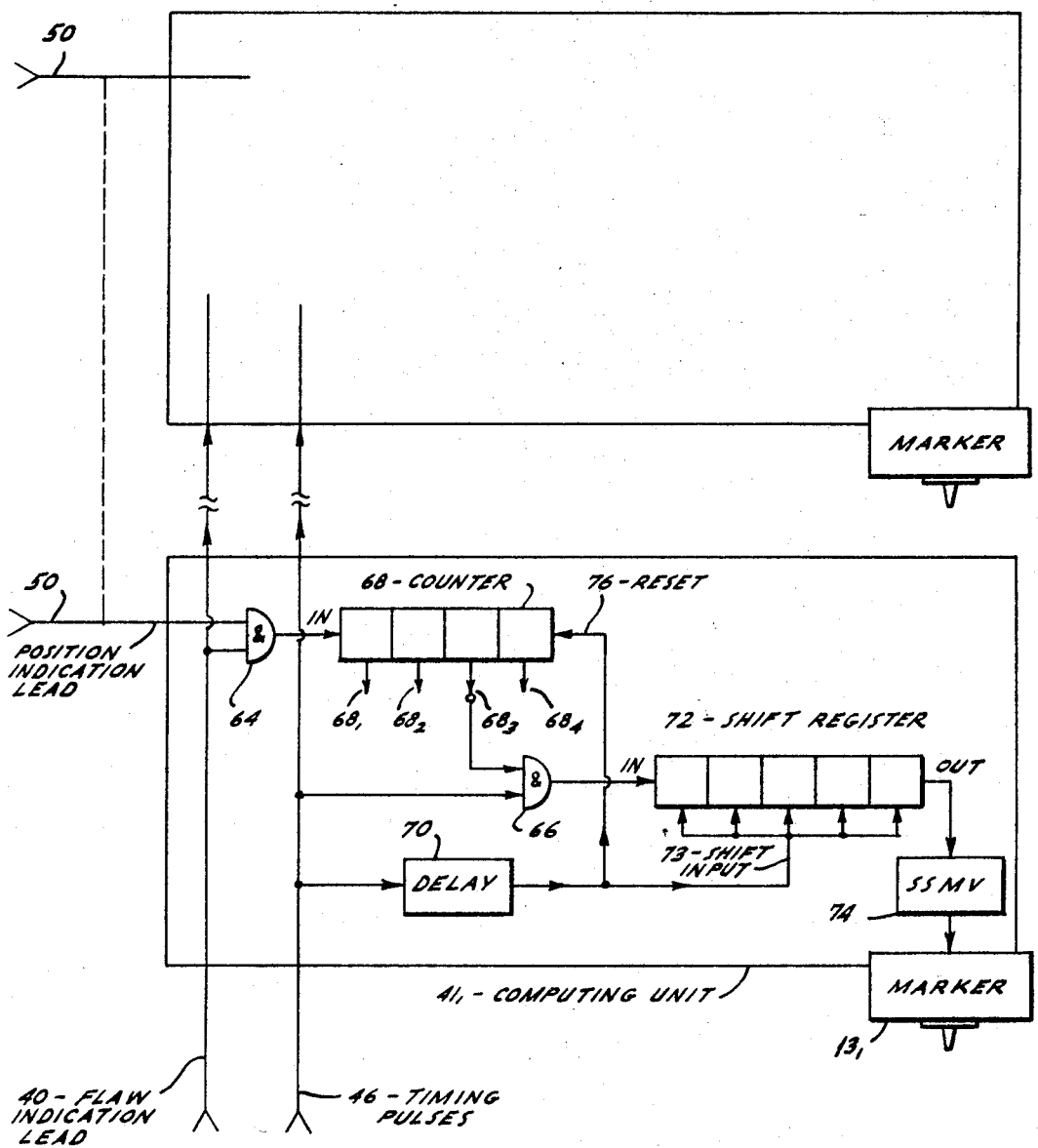

United States Patent Office 3,445,672
Patented May 20, 1969

3,445,672
FLAW DETECTION AND MARKING SYSTEM
Bruce G. Marks, Lansdale, Pa., assignor to Philco-Ford Corporation, a corporation of Delaware
Filed Aug. 15, 1966, Ser. No. 572,430
Int. Cl. G01n 21/30, 21/32
U.S. Cl. 250—219
10 Claims This invention relates to a marking system and more particularly to a system for marking those areas of a scanned body of material where flaws have been detected.

In manufactured homogeneous materials such as glass, flaws or irregularities such as dirt, bubbles, or nicks are usually present in varying amounts per section or unit area of material. Manufacturers or consumers of glass in large quantities, such as automobile manufacturers or construction companies, must often inspect all incoming glass for such flaws prior to approving the glass for sale or installation. Heretofore such inspection was performed manually by trained operators who scanned each sheet of glass in detail and marked sections containing flaws with an easily discernible mark, e.g., with a marking crayon of bright color. If a given section or area of glass had more than a predetermined number of marks it would be rejected. As will be obvious to those skilled in the art, such manual inspection is imperfect and costly to perform.

A system for automatically inspecting glass or other similar material by means of an optical/electrical scanning system is disclosed in the copending application of G. Revesz, N. Bennicelli, and B. G. Marks, entitled "Electrical System," filed Feb. 15, 1966, Ser. No. 527,435. Said system utilizes an optical scanning apparatus shown in more detail in the copending application of B. G. Marks and G. Revesz, Ser. No. 457,725, filed May 21, 1965, entitled "Method and Apparatus for Scanning." The optics of said scanning system are explaned in detail in the copending application of F. P. Keiper, Jr., A. H. Ett, and G. Revesz, Ser. No. 410,090, filed Nov. 10, 1964, now Patent No. 3,370,176 entitled "Radition-Sensitive Means for Detecting Flaws in Radiation-Transmissive Material." These applications deal generally with a scaning system which is designed to provide an indication automatically in response to each flaw (such as embedded dirt or bubbles) which is present in a given portion of glass, but not if the flaw constitutes foreign surface material, such as dirt or water, which would not render the given portion of glass unsuitable.

The present invention is useful in conjunction with the aforementioned flaw detection system for automatically marking the section of the scanned glass where the flaw occurred, and alternatively for marking the section of glass only when greater than a predetermined number of flaws per unit area are detected.

Accordingly several objects of the present invention are: (1) to provide apparatus for automatically marking a given section of previously scanned material where one or a predetermined number of flaws are detected during the scanning operation, (2) to provide a system for automatically marking a predetermined portion of scanned material when either one or a predetermined number of outputs are produced during this scanning operation, and (3) to provide an automatic marking system of the type described which is useful in conjunction with the afore-referenced flaw detection system.

SUMMARY

According to the presnt invention a sample of material is scanned and a flaw indication output is provided in response to each irregularity encountered. Simultaneously a position indication is provided to indicate which of a predetermined plurality of areas of the body is being scanned at each instant. Marking means responsive to the flaw indication output and the position indication output are provided for marking those areas of the body in which more than a predetermined number of flaw indication outputs are provided. Associated with the marking means is a suitable delay means for insuring that the marking means is not achieved until the portion of the body where the flaws were discovered and the marking means are adjacent.

DRAWINGS

FIG. 1 is a perspective view of this scanning and marking system of the present invention.

FIG. 2 is a schematic diagram of a marking computer utilized in the system of FIG. 1.

FIG. 1 (DESCRIPTION)

In the system of FIG. 1 a glass sample 10, which travels in the direction indicated, is scanned with a beam of light 12 utilizing a scanning raster of adjacent sequential lines. When the scanning beam encounters a flaw in the glass sample 10, a suitable indication is provided and if more than a predetermined number of flaws are detected in a given section of the glass, said section of glass is suitably marked by one of a plurality of markers 13 which are positioned over the glass downstream from the scanning position.

The scanning system comprises a light source 14 arranged to project the beam of light 12 into a tube 11. The peripheral portion of the beam passes around a prism 13 which has an opaque face 15 and thence through a lens 16 into an enclosure 18 which contains apparatus arranged to cause the light beam to scan a raster across the glass sample as the sample travels in the direction indicated.

The enclosure 18 contains a platform 20 having identical pairs of mirrors 22 and 24 mounted thereon as indicated. (In the drawing all mirrors are designated by the legend M.) The platform 20 is made to rotate in the indicated direction by a motor 26. At the instant indicated, the incoming light beam from source 12 is reflected from a fixed mirror 30 onto the innermost mirror of pair 24 and thence in a horizontal direction to the outermost mirror and thence upwardly through an aperture 32 in the enclosure 18, through the glass sample 10 to a second fixed mirror 34. The light is reflected from mirror 34 back through glass sample 10 along the aforedescribed incident path via mirrors 24 and mirror 30 back to lens 16.

As explained in the aforementioned Marks and Revesz application, if the mirrors of each pair are spaced a predetermined distance apart, the light beam 12 will make a substantially linear trace across the glass sample 10 each time a pair of mirrors passes the light beam, or two such traces for each revolution of platform 20. When the glass sample 10 travels in the direction indicated, the entire surface of the glass sample will be scanned by a raster of adjacent sequential lines.

As also explained in the copending Keiper, Ett, and Revesz application, if no flaws are present in the glass sample 10 during a particular scan thereacross, the entire return beam projected into tube 11 from mirror 30 will impinge on only the periphery of lens 16 and will be focused by lens 16 back toward the light source. However if any flaw or other surface matter or defect is present in the portion of glass sample 10 being scanned during a particular line, a perturbation of the light beam will be created and a portion of the return beam projected into tube 11 from mirror 30 will briefly impinge on the center of lens 16, so that the right hand face of prism 15 will receive a light pulse. The prism will reflect the light pulse downwardly into vertical tube 36.

The light pulse projected down tube 36 is sensed by a photocell in a flaw detection computer 38 which will generate an electrical pulse whose shape is governed by the nature of the light pulse projected down tube 36. As explained in the copending Revesz, Bennicelli, and Marks application, by analyzing the shape of the electrical pulses, computer 38 is able to distinguish between foreign surface matter on the glass, such as water or dirt, and internal flaws such as bubbles and imbedded dirt. Computer 38 is arranged to provide an output pulse on lead 40 in response to each flaw encountered in the glass sample. Alternatively computer 38 may be a simple photocell and amplifier circuit arranged to provide an output pulse on lead 40 in response to each received light pulse so that the system will be responsive to all defects (surface or internal) associated with the glass sample 10. Lead 40 is connected to a marking computer 41, which is explained infra.

The glass sample 10 is made to travel in the direction indicated by means of a motor 40 which is coupled to a drive cylinder 42 in contact with the sample 10. The shaft of motor 40 is also coupled to a rotating contact arm 43 which is connected to a bias source 45. Each time arm 43 rotates it contacts a lead 46 and thereby generates timing pulses on lead 46, which is also connected to an input of computer 41. The spacing of these pulses is proportional to the rotational distance travelled by the motor and hence to the linear distance travelled by the glass sample 10.

As each line of the raster is traced by the scanning beam 12 a plurality of position indication leads 50 are sequentially energized so as to provide a continuous indication of the instantaneous position across the glass of the scanning beam. Each lead is representative of one of a plurality of parallel elongated areas (strips) of the surface of glass sample 10 whose major axes are crossed by the lines of the scanning raster. For instance lead $50_1$ is representative of the strip of the glass sample 10 closest to the observer.

The position indication leads 50 are sequentially energized by means of a marker light 52 and a plurality of respective position indication photocells 54. The marker light 52 is arranged to project a light beam 53 downwardly toward the inner mirror of the pair of mirrors 22, which are spaced 180° from the pair 24 which is shown receiving the scanning beam 12. The beam 53 is reflected to the outer mirror of pair 22 and upwardly to the marker photocells 54. As the platform rotates, the beam 53 will sweep across the photocells 54 in the same manner as the scanning beam 12 is swept across the glass sample. Thus as the photocells 54 are traversed by the marker beam 53, leads 50 will be sequentially energized. Leads 50 are also connected to the marking computer 41.

The marking computer 41, which is shown in detail in FIG. 2, consists of a plurality of computing units, one for each of the photocells 54. Each of the computing units drives a respective one of the markers 13. The flaw indication lead 40 and the timing pulse lead 46 are each connected in parallel to all of the computing units, while the position indication leads 50 are each connected to a respective one of the computing units. As shown, the leads 50 are arranged so that the photocells 54 are connected to the computing units in reverse order of arrangement; that is, the closest photocell is connected to the farthest computing unit from the observer, and so on. This is because the glass and photocell scanning arrangement is such that the closest photocell and the farthest section of the glass sample are scanned simultaneously.

FIG. 1 (OPERATION OF SYSTEM)

In operation, as the glass sample 10 travels in the direction indicated, it is repetitively scanned by the light beam from source 14. Assume that during a particular line scan a flaw or irregularity in the glass encountered such as to cause the flaw detection computer 38 to supply an output pulse on lead 40 to each of the computing units in marking computer 41. Simultaneously one of the position indication photocells 54 will be illuminated by the marker beam 53, causing an output to be supplied to the appropriate one of the computing units in marking computer 41 via one of the leads 50. Thus only the particular unit in computer 41 which is positioned over the strip in the glass sample 10 directly downstream from the flaw will receive both position indication and flaw indication inputs. This particular unit will thereby register the flaw indication pulse. If a unit registers a presettable number, from one to $n$ where $n$ is an integer, of flaw indication pulses between any two timing pulses on lead 46, a mark indication will be registered within the unit indicating that the particular area of the sample of glass wherein the flaw indication pulses were generated should be marked. Each unit of the marking computer includes delay circuitry, desirably in the form of a shift register as discussed infra, to energize its respective marker 13 at the proper time so that the glass sample 10 will be marked when the area which contained the flaws is underneath the marker. Each computing unit can be set to mark the glass sample 10 in response to any predetermined number of flaws per unit area.

FIG. 2 (DESCRIPTION OF MARKING COMPUTERS)

The marking computer 41 of FIG. 1 comprises a plurality of identical computing units of which only the first unit $41_1$ is shown in detail. Each unit is connected to a respective one of the position indication leads 50, the flaw indication lead 40, and the timing pulse lead 46, with leads 40 and 46 being connected in parallel to each unit.

The output of each unit is arranged to actuate a respective one of the markers 13 so that an easily visible mark will be provided on the adjacent portion of the glass sample 10. Each marker may comprise a solenoid whose armature is attached to a glass marking crayon, for example.

Computing unit $41_1$ includes two AND gates, 64 and 66, a counter 68, a delay unit 70, a shift register 72, and a single shot multivibrator 74. AND gate 64 has one input connected to the position lead $50_1$ and another input connected to flaw indication lead 40. Counter 68 has an input connected to the output of AND gate 64 and has a plurality of output leads $68_1$, $68_2$, etc., which are sequentially energized to indicate the number of pulses supplied to counter 68 from AND gate 64.

The design of the counter is such that each output lead which is energized will remain energized until the reset input 76 is energized. One suitable way in which each output lead of the counter can be kept energized after the count progresses beyond the associated stage is to provide an additional flip-flop for each stage of the counter which will become "set" when its associated stage of the counter is turned on. Reset lead 76 will of course be connected to the reset inputs of all of the auxiliary flip-flops.

AND gate 66 has one input connected to the timing pulse lead 46 and another input connected to one of the output leads of counter 68 according to the number of flaws to occur in a given section of glass for marking to occur. The output of AND gate 66 is connected to the input of shift register 72.

Delay unit 70, which is connected between the timing pulse lead 46 and the shift input lead 73 of the shift register 72, provides a very brief delay to enable the stages of the shift registers to become "set" before the shift input will be supplied thereto. The output of delay unit 70 is also connected to the reset input 76 of counter 68. The output of register 72 is connected to the input of the first marker, $13_1$, by way of the monostable or single shot multivibrator 74 which is arranged to provide a driving pulse of suitable amplitude and duration for activation of the marker.

FIG. 2 (OPERATION OF MARKING COMPUTER)

As stated, the position indication leads 50 are sequentially energized during each line of scan. The timing pulse lead 46 is energized once per revolution of drive motor 40 of FIG. 1 and hence once per given increment of travel of the glass sample 10. As will be apparent, the length of travel of glass sample 10 between timing pulses can be adjusted in several ways, for example by changing the diameter of drive roller 42. The flaw indication lead 40 is energized each time the scanning raster encounters an irregularity or flaw in the glass sample.

To explain the operation of a computing unit it will be assumed that a flaw is present in the glass directly upstream of the marking unit $13_1$. Thus when the flaw is scanned, flaw indication lead 40 will be energized while the position indication lead $50_1$ is energized. AND gate 64 will receive thus two inputs simultaneously and accordingly provide an output which will set the first stage of counter 68 so that output $68_1$ thereof will be energized. Assume that during the next several scans of the glass sample 10, at elast two more flaws are detected while position lead $50_1$ is energized. Accordingly AND gate 64 will supply at least two more pulses to counter 68 so that output $68_3$ thereof and hence the upper input of AND gate 66 will be energized. When the next timing pulse on lead 46 arrives, the other input of AND gate 66 will be energized so that an output will be provided to set the first stage of shift register 72. After a brief delay in delay unit 70, the same timing pulse on lead 46 will be supplied to the shift input 73 shift register 72, causing the set state of the first stage to be shifted to the second stage. The output of delay unit 70 will also be supplied on lead 76 to reset all of the stages and the output flip-flops of counter 68.

The next few timing pulses on lead 46 will continue to shift the location of the set stage of register 72 until the last stage thereof is set. During this time, the glass sample 10 has been travelling in the direction indicated in FIG. 1 toward the markers so that the portion of the glass sample which contained the flaws which originally caused the first stage of the shift register to be set will move to a position underneath the markers. The number of stages of the shift register 72 and the position of the markers 12 should be such that when the next timing pulse on lead 46 occurs, the aforenoted portion of the glass sample which contained the flaws will be directly under marker $13_1$. Thus when the pulse on lead 46 arrives, the information will be shifted out of shift register 72, the one shot multivibrator 74 will be triggered, and marker $13_1$ will mark the portion of the glass sample which contained the flaws.

From the foregoing analysis it will be evident that the operation of the system is such that each area of the glass sample 10 which contains a preset number of flaws will automatically be marked by the system. The width of the areas can be adjusted by changing the number and spacing of photocells 54 and associated computing units 12 and the length of the areas can be adjusted by changing the size of drive roller 42. The number of flaws per area necessary to cause the area to be marked can be adjusted by changing the contact position of the upper input of AND gate 66 on the outputs of counter 68.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

I claim:
1. In combination:
 (a) scanning means for scanning a body of substantially homogeneous material with a scanning beam and for providing a flaw indication output in response to each irregularity in said body encountered by said scanning beam,
 (b) position indicating means for providing a simultaneous indication of which of a predetermined plurality of areas of said body said scanning element is traversing at each instant, and
 (c) marking means, responsive to said scanning means and said position indicating means, for marking each area of said body in which said scanning beam encounters a predetermined number, from 1 to $n$, where $n$ is a whole integer, of irregularities.

2. The combination of claim 1 wherein said scanning beam is arranged to scan a surface of said body with a raster of adjacent, parallel lines and wherein said position indicating means is arranged to provide a first indication as to which of a predetermined plurality of parallel elongated areas of said surface said scanning beam is traversing at each instant, the lines of said raster crossing the major axes of said predetermined plurality of areas, and a second indication each time a predetermined length of said body, measured normal to the lines of said raster, is scanned.

3. The combination of claim 2 wherein said marking means comprises a predetermined plurality of marking units, each of said marking units being associated with one of said plurality of said parallel elongated areas, each of said marking units comprising: (1) a marker for marking its associated elongated area of said surface of said body in response to a predetermined input thereto, said marker and said surface of said body being moved relative to each other as said scanning occurs such that said means for marking remains adjacent the major axis of its elongated strip, (2) means for counting the number of flaw indication outputs produced during the intervals when said scanning element is traversing the associated elongated area of said surface, (3) means for providing an indication in response to a count by said counting means of said predetermined number from 1 to $n$ of flaw indication outputs during a selected interval including a plurality of lines of said raster, and (4) means, responsive to said last indication, for supplying said predetermined input to said marker when the area of said surface of said body in which said flaw indication outputs were generated and said marker are adjacent each other.

4. The combination of claim 1 wherein said scanning beam comprises a first light beam and wherein said position indicating means comprises a second light beam, said scanning means including deflection means for causing said first light beam to scan across a surface of said body with a raster of adjacent, parallel lines, and said second beam of light to scan across a plurality of photocells, each representing one of a plurality of elongated parallel areas of said surface whose major axes are crossed by said lines of said raster, each of said photocells being connected in a circuit so as to provide a predetermined signal on an associated terminal in response to traversal thereof by said second beam.

5. The combination of claim 4 wherein said deflection means comprises a rotatable platform having an axis of rotation normal thereto, said platform having two pairs of reflectors symmetrically positioned about the axis of rotation thereof, the two reflectors of each pair of reflectors being disposed in spaced, confronting relation, the four reflectors of said two pairs being disposed in radial alignment on said platform, said first light beam of light being projected toward said platform parallel to and spaced from said axis of rotation, each pair of reflectors being disposed such that said beam of light will be at least part of the time incident on an inner reflector and reflected therefrom to the outer reflector and thence to said surface of said body so as to generate a trace across said body as said platform rotates, said second light beam being positioned opposite said axis of rotation from said first light beam such that said second beam will impinge upon the opposite pair of reflectors upon which said first beam impinges, said photocells being positioned so as to be traversed by said second beam after reflection from the outer reflector of said pair as said platform rotates.

6. The combination of claim 5 wherein said body comprises a sheet of glass and said combination includes means for causing relative linear movement of said sheet of glass and said platform so that, as said platform rotates, said first light beam will scan the surface of said glass sheet with a raster of sequentially adjacent, parallel lines.

7. A flaw detecting and marking system, comprising, in combination:
   (a) means for scanning a beam across a surface of a body of substantially homogeneous material in a raster of sequential adjacent lines and for producing a flaw indication signal each time said beam element of said raster encounters an irregularity in said body,
   (b) means for supplying sequentially a plurality of scanning element position indicating signals as said beam scans each line of said raster, each of said position indicating signals being representative of a respective one of a plurality of parallel elongated areas of said surface whose major axes are crossed by said lines of said raster,
   (c) means for supplying a timing signal each time a predetermined length, measured normal to said lines of said raster, is scanned,
   (d) means, responsive to said position indicating signals and timing signal, for providing a respective mark command signal for each of said elongated areas of said surface when a predetermined number, from 1 to $n$, where $n$ is a whole integer, of flaw indication signals are produced concomitantly with a respective one of said position indicating signals and during the period between successive timing signals, and
   (e) means, responsive to said mark command signal, for marking the position of each of said parallel elongated areas of said surface which was scanned at the time said flaw indication signals were generated.

8. The system of claim 7 wherein said (d) means comprises a plurality of marking computers, each supplied with a different one of said position indicating signals, said flaw indication signal, and said timing signal, each arranged to produce a first signal when a flaw indication signal occurs while a position indicating signal is supplied thereto, each also arranged to produce said mark command signal if a predetermined number of said first signals are produced during the period between successive timing signals.

9. The system of claim 7 wherein said (e) means comprises a plurality of marking devices, each associated with a respective elongated area of said surface and spaced from the region of said surface being scanned by said scanning element, and further including a respective plurality of delaying means responsive to said mark command signals for energizing said marking devices a predetermined interval after receiving said mark command signal.

10. The system of claim 7 wherein said means for scanning comprises a rotatable platform having an axis of rotation normal thereto, said platform having two pair of reflectors symmetrically positioned about the axis of rotation thereof, each pair of reflectors being disposed in spaced confronting relation in radial alignment on said platform, said scanning beam comprising a first light beam, said beam being projected toward said platform parallel to and spaced from said axis of rotation, each pair of reflectors being disposed such that said beam of light will be incident at least part of the time on an inner reflector of a pair and reflected therefrom to the outer reflector of said pair and thence to said surface of said body so as to generate a trace across said body as said platform rotates, and wherein said (b) means comprises a second light beam and a plurality of photocells connected in a corresponding plurality of respective circuits, each circuit representing a respective one of said plurality of elongated areas of said surface and each circuit arranged to generate one of said plurality of position indicating signals when energized by said second light beam, said second light beam being positioned about said axis of rotation opposite to said first light beam such that said second beam will impinge upon the opposite pair of reflectors upon which said first beam impinges, said photocells being positioned so as to be traversed by said second beam after reflection from the outer reflector of the currently impinged pair as said platform rotates.

References Cited

UNITED STATES PATENTS

| 2,246,906 | 6/1941 | Viebahn et al. | 88—14 |
| 3,101,415 | 8/1963 | Libenschek | 250—219 |
| 3,286,567 | 11/1966 | Wright | 250—219 X |
| 3,370,176 | 2/1968 | Ett et al. | 250—219 |

WALTER STOLWEIN, *Primary Examiner.*

U.S. Cl. X.R.

250—209; 356—237